June 9, 1964 A. MACOVSKI ETAL 3,136,846

SCREEN GRID PULSING OF CHROMA AND BURST AMPLIFIER

Filed Sept. 24, 1956

2 Sheets-Sheet 1

INVENTORS.
Albert Macovski
& Louis F. Schaefer

BY Glen J. Mitchell
ATTORNEY

SCREEN GRID PULSING OF CHROMA AND BURST AMPLIFIER

Filed Sept. 24, 1956

INVENTORS.
Albert Macovski
& Louis E. Schaefer
BY
ATTORNEY

United States Patent Office 3,136,846
Patented June 9, 1964

3,136,846

SCREEN GRID PULSING OF CHROMA AND BURST AMPLIFIER

Albert Macovski, Massapequa, and Louis F. Schaefer, Lynbrook, N.Y., assignors to Radio Corporation of America, a corporation of Delaware Filed Sept. 24, 1956, Ser. No. 611,615
7 Claims. (Cl. 178—5.4)

Figure 1:
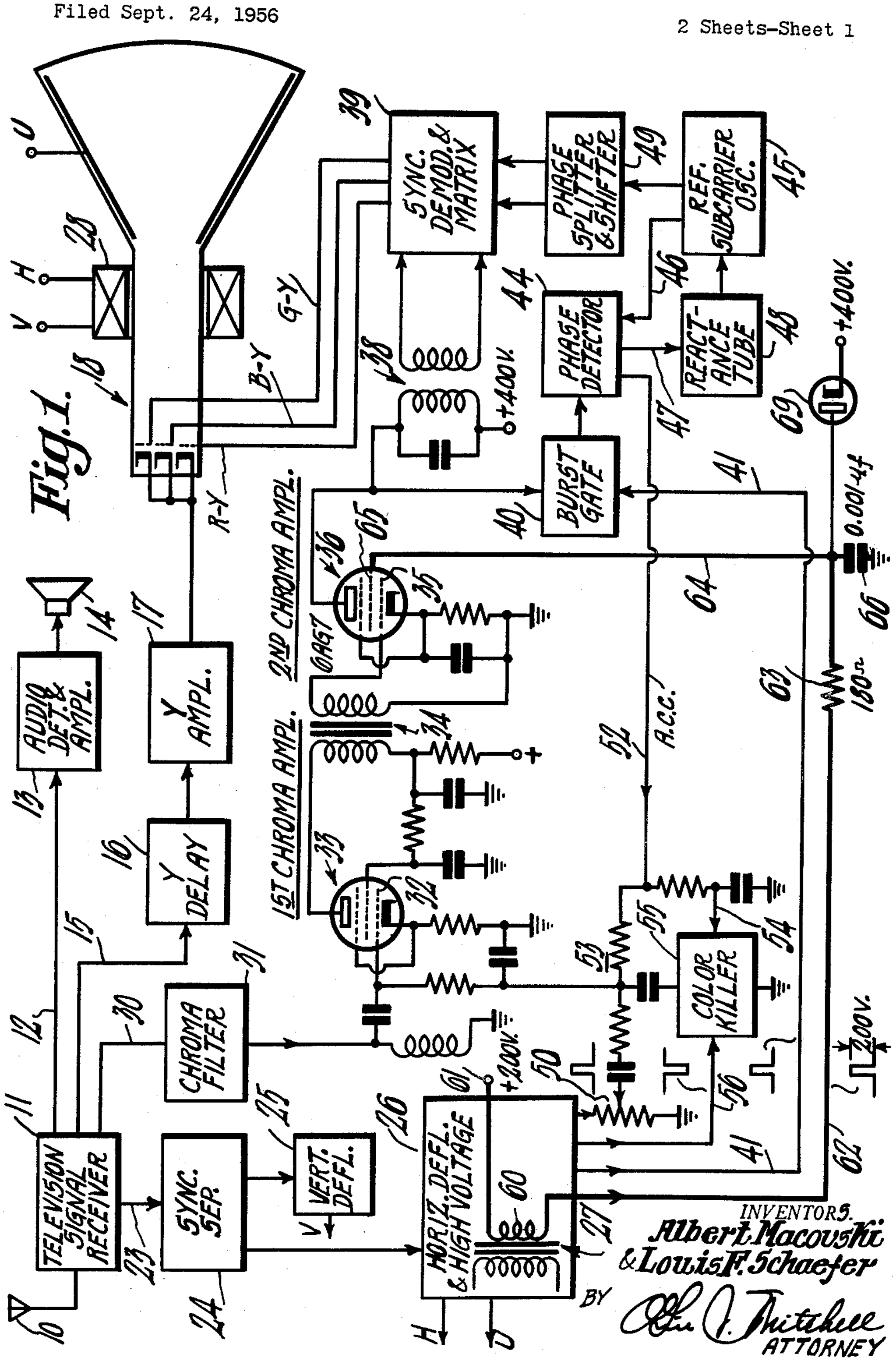

This invention relates to color television receivers of the type wherein the chrominance signal and the color subcarrier bursts are amplified together in a chroma channel, and more particularly to an arrangement whereby the color subcarrier bursts are amplified more than the chrominance signal.

The color television standards adapted by the Federal Communications Commission on December 17, 1953 provide that a broadcasted radio frequency carrier be modulated during each scan line with a brightness or luminance signal having frequency components from zero to 4.1 megacycles, and with a chrominance or chroma signal having sideband frequency components extending from 2 to 4.1 megacycles and related to a suppressed color subcarrier frequency of 3.58 megacycles. Between each scan line, the radio frequency carrier is modulated with a deflection synchronizing pulse having a "back porch" carrying a burst of at least eight cycles of the color subcarrier frequency. A color television receiver presently in widespread use demodulates the received radio frequency carrier, amplifies the luminance portion of the signal in a so-called Y amplifier, and amplifies the chrominance signal and the bursts in a separate chroma amplifier. The bursts are separated from the output of the chroma amplifier and used to control the frequency of a color subcarrier oscillator. The output of the oscillator is utilized, together with the chroma signal output of the chroma amplifier, in synchronous demodulators to provide color difference signals. The outputs of the demodulators and the output of the Y amplifier are applied to a picture reproducer, such as a three-gun shadow mask kinescope.

A color television receiver cannot reproduce a color picture unless the color subcarrier oscillations generated therein are locked in phase and frequency with the received bursts. In weak signal areas, the inadequate amplification of the bursts results in a totally unacceptable color picture, whereas the inadequate amplification of the luminance and chrominance signals merely results in a somewhat degraded color picture. It is therefore a general object of this invention to provide a simple and inexpensive system for amplifying the bursts to a greater extent than the chrominance signal.

The amplified color subcarrier bursts are also commonly used in the receiver to control the operation of an automatic chroma control circuit and a color killer circuit. The frequency of the color subcarrier bursts is within the range of frequencies occupied by the chrominance signal and the bursts are conveniently used as an indication of signal strength for automatically controlling the gain of the chroma amplifier. The higher the level of the bursts, the simpler and more effective is the automatic chroma control circuit.

Color television receivers are constructed to reproduce received black-and-white signals as black-and-white pictures. The receiver distinguishes between black-and-white and color signals by the absence of presence, respectively, of color subcarrier bursts on the back porch of the horizontal synchronizing pulses. When the bursts are absent, a color killer circuit is employed to deenergize the chroma amplifier so that spurious signals cannot produce spurious colors in the black-and-white picture. The reliability of the color killer circuit in recognizing the presence and absence of bursts is enhanced by providing additional amplification of the bursts.

It is therefore another object of this invention to provide simple means for improving the operation of automatic chroma control and color killer circuits.

It is a further object to provide increased amplification of the bursts without the addition of another amplifying device.

It is a still further object to provide a color television receiver system wherein both the chroma signal and the burst signal are amplified in an amplifier in different degrees which correspond with the relative importance of the signals to proper operation of the receiver.

A color television receiver constructed according to the teachings of this invention may include a chroma amplifier having a pentode vacuum tube provided with a control grid and a screen grid. The chrominance signal and the color subcarrier bursts are applied to the control grid. A secondary winding is provided on the horizontal deflection and high voltage transformer to provide a positive pulse occurring during each burst (immediately following each horizontal synchronizing pulse). The secondary winding may be similar to others commonly provided for other functions in the receiver. One side of the secondary coil is connected to a source of positive potential having a value appropriate for application to the screen grid of a pentode amplifier tube. The other end of the secondary coil is connected to the screen grid of the pentode tube in the chroma amplifier. The positive pulse induced in the coil is thereby superimposed on the fixed positive potential normally applied to the screen grid to provide increased amplification during the bursts. The duration of each positive pulse and each burst, according to the standards in the U.S., is such as to provide a duty cycle of only about 4 percent. Therefore, greatly increased amplification of the bursts is obtained, while operating the pentode tube between bursts at, or nearly at, rated screen dissipation. A diode may be employed to insure the application of a pulse of constant amplitude to the screen grid.

Figure 2:
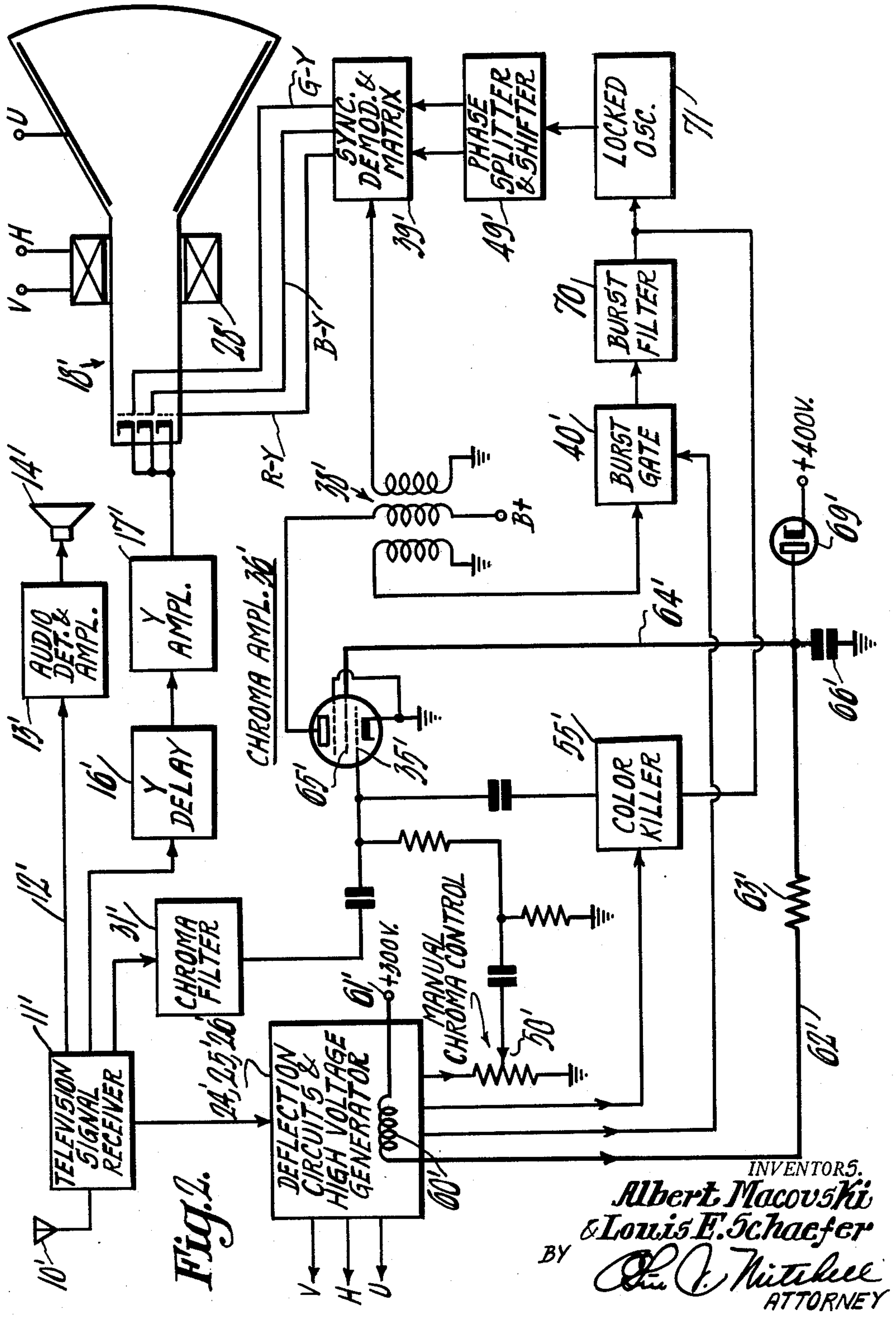

These and other objects and aspects of the invention will be apparent to those skilled in the art from the following more detailed description taken in conjunction with the appended drawings, wherein:

FIG. 1 is a diagram of a color television receiver constructed according to the teachings of the invention; and FIG. 2 is a diagram of another color television receiver also incorporating the invention.

FIGURE 1 shows a color television receiver wherein a received signal from an antenna 10 is applied to a television signal receiver which includes a radio frequency amplifier, a converter, an intermediate frequency amplifier and a second detector. Therefore, the outputs of the receiver 11 provide the video signal and the frequency modulated subcarrier aural signal corresponding with those employed to modulate the radio frequency wave at the transmitter. One output 12 of the receiver 11 couples the aural signal to an audio detector and amplifier 13 having an output coupled to a loudspeaker 14. Another output 15 of the receiver 11 is applied through a Y channel including a Y delay means 16 and a Y amplifier 17 to the cathodes of three guns in a color kinescope 18. The Y channel handles the luminance or brightness signal having frequency components between zero and 4.1 megacycles.

A third output 23 from the receiver 11 is applied to a sync separator 24 which separates the synchronizing pulses from the video signal and applies them to a vertical deflection circuit 25 and to a horizontal deflection and high voltage circuit 26. The output V of the vertical deflection circuit 25 is applied to the similarly designated input of the deflection means 28 of the kinescope 18. The outputs H and U of the horizontal deflection and high voltage circuit 26 are applied to the correspondingly designated inputs of the kinescope 18.

The horizontal deflection and high voltage circuit 26 may be of a conventional type such as that shown in FIGS. 11–24 on page 380 of "Color Television Engineering," J. W. Wentworth, McGraw-Hill, 1955. The circuit 26 includes a high voltage transformer 27 having secondary coils (only one of which is shown in FIG. 1) which provide pulses occurring immediately following the horizontal synchronizing pulses, and coinciding with the time allocated to color subcarrier bursts.

A fourth output 30 of the receiver 11 is applied through a chroma filter 31 to the control grid 32 of a first chroma amplifier tube 33. The chroma filter 31 passes component frequencies in the range of from about 2 to 4.1 megacycles. The first chroma amplifier pentode tube 33 has its output coupled through a transformer 34 to the control grid 35 of a second chroma amplifier pentode vacuum tube 36.

The first and second chroma amplifiers amplify both the chroma or chrominance signal and the color subcarrier frequency bursts. The chroma signal from the second chroma amplifier is coupled through the output transformer 38 to the input of a synchronous demodulating and matrixing circuit 39. The bursts in the output of the second chroma amplifier are separated from the chroma signal by means of a burst gate 40. A gating pulse is applied to the burst gate 40 over a lead 41 from the horizontal deflection and high voltage circuit 26.

The amplified bursts passed by the burst gate 40 are applied to a phase detector 44. The output of a reference subcarrier oscillator 45 is also applied to the phase detector 44 over a lead 46. The phase detector 44 generates a correction voltage whenever there is a difference between the frequency of the received bursts and the frequency of the reference oscillator. The correction voltage is applied over lead 47 to a reactance tube circuit 48 which corrects the frequency of the reference subcarrier oscillator 45.

The output of the oscillator 45 is applied through a phase splitter and shifter 49 to the synchronous demodulating and matrixing circuit 39. The circuit 39 demodulates the chroma signal applied thereto from the second chroma amplifier, and provides three collor difference signals R—Y, B—Y, and G—Y which are applied to the control grids of red, blue, and green guns, respectively, in the kinescope 18.

A negative automatic chroma control voltage is provided on lead 52 from the phase detector 44 which has an amplitude corresponding with the amplitude of the bursts from the burst gate 40. This control voltage on lead 52 is applied through a network 53 to the control grid 32 of the first chroma amplifier tube 33. The voltage varies in such a way as to maintain the amplification of the chroma signal in the chroma amplifiers substantially constant. The control grid 32 of the first chroma amplifier also receives a positive pulse occurring during each burst from the horizontal deflection and high voltage circuit 26 through the manual chroma control potentiometer 50. The potentiometer 50 permits manual adjustment of the level maintained by the automatic chroma control circuit, by changing the level of the bursts.

A color killer circuit 55 is provided to cut off the first chroma amplifier when a monochrome signal is received as evidenced by the absence of color subcarrier bursts. The color killer tube operates in response both to a negative pulse received on lead 56 from the horizontal deflection and high voltage circuit 26, and to the automatic chroma control voltage received on leads 52 and 54. The negative pulse coinciding in time with each burst causes the color killer to render the first chroma amplifier conductive during burst time whether a burst is present or not. In the absence of bursts, the voltage on lead 52 causes the color killer to cut off the first chroma amplifier between bursts. For a more complete description of the system as thus far described, reference is made to continuation application Serial No. 565,387 filed on February 14, 1956 by Albert Macovski and entitled "Television Chrominance Channel Control System," now U.S. Patent No. 2,921,122, issued January 12, 1960.

According to the present invention, an additional secondary coil 60 is provided on the transformer 27 in the horizontal deflection and high voltage circuit 26. One side of secondary coil 60 is connected to the positive terminal 61 of a source of potential suitable for application to the screen grid of an amplifier tube. The other end of secondary coil 60 is connected thru lead 62, resistor 63 and lead 64 to the screen grid 65 of the second chroma amplifier tube 36. A capacitor 66 provides the usual radio frequency bypass to ground. The secondary coil 60 is poled to provide a positive pulse during each interval allotted to the color subcarrier synchronizing bursts. The positive pulses applied to the screen grid 65 are superimposed on the positive biasing potential normally applied to the screen grid. The positive pulses cause an increased amplification of the bursts when they are present. Stated another way, the second chroma amplifier tube 36 amplifies the bursts a great deal more than it amplifies the chroma signal between bursts.

The invention may be applied to a receiver wherein the chroma amplifier tube is already operated practically to the limit of its rating. The positive pulses may be applied to the screen grid of a tube operated at maximum screen dissipation and maximum output. The pulse applied to the screen then raises both the gain and maximum output of the tube during the burst interval. The period when bursts are present amounts to only about 4 percent of the time. Therefore, a very great increase in amplification of the bursts is accomplished with a trifling increase in screen dissipation. Using values shown on the drawing, it was found that the gain of the amplifier during bursts was approximately doubled.

A limiting diode 69 may be added with its anode connected to the screen grid 65 and with its cathode connected to a source of positive potential. The diode prevents the pulses applied to the screen grid from exceeding the value of the source of potential.

By increasing the gain of the chroma amplifier during bursts, the amplified bursts therefrom greatly improve the operation of circuits receiving the bursts. The circuits dependent on the bursts include the phase detector and the associated color subcarrier synchronizing circuits, the automatic chroma control circuit, and the color killer circuit. The first and most important requirement of reproducing a color picture is to establish proper color subcarrier synchronization from the bursts. According to the invention, the gain of the chroma amplifier is cyclically varied to provide a degree of extra amplification of the bursts in accordance with the relatively greater importance of the bursts to proper operation of the receiver. The greatly improved results, especially in weak signal areas, are accomplished by the mere addition of a secondary winding 60 on the deflection transformer.

FIG. 2 shows another color television receiver wherein elements corresponding to those of FIG. 1 are given the same reference numerals with prime designations added. The system of FIG. 2 differs from that of FIG. 1 in that automatic chroma control is not provided, a different color subcarrier oscillator synchronizing arrangement is employed including a burst filter 70 and a locked oscillator 71, and only one chroma amplifier tube 65′ is used. The chroma signal and bursts are applied from filter 31′ to the control grid 35′ of the chroma amplifier tube 36′. A positive pulse is superimposed on the normal screen voltage by a connection from a source 61′ of positive potential through a secondary coil 60′ on the transformer in the horizontal deflection and high voltage circuit 26′. The other side of coil 60′ is connected thru a resistor 63′ to the screen grid 65′ of the chroma amplifier tube 36′. The increased amplification of the bursts improves the operation of all circuits dependent on the bursts. Stated another way, the increased amplification of the bursts permits economies in the circuits utilizing the amplified bursts without adversely affecting the operation of the circuits.

What is claimed is:

1. In a color television receiver adapted to receive a video signal including during each scan line a luminance portion and a chrominance portion, and including between successive scan lines a synchronizing pulse and a burst of oscillations at a color subcarrier frequency, comprising, a chroma amplifier including a vacuum tube having a control grid and a screen grid, means to apply said chrominance portion and said bursts to said control grid, means responsive to said synchronizing pulses to generate positive polarity pulses coinciding in time with said bursts, and means to apply said pulses to said screen grid to appreciably increase the gain and maximum output of said chroma amplifier only when said bursts are applied to said control grid.

2. In a color television receiver, adapted to receive a video signal including during each scan line a luminance portion and a chrominance portion, and including between successive scan lines a synchronizing pulse and a burst of oscillations at a color subcarrier frequency, comprising, a chroma amplifier including a vacuum tube having at least two grid electrodes, means to apply said chrominance portion and said bursts of oscillations to one of said grid electrodes, means responsive to said synchronizing pulses to generate positive pulses coinciding in time with said bursts of oscillations, and means for substantially increasing the gain and maximum output of said chroma amplifier during the time interval when said bursts are applied to said one of said grid electrodes, said last named means comprising means to apply said pulses to the other of said grid electrodes.

3. In a color television receiver, adapted to receive a video signal including during each scan line a luminance portion and a chrominance portion, and including between successive scan lines a synchronizing pulse and a burst of oscillations at a color subcarrier frequency, comprising, a chroma amplifier including a vacuum tube having at least two grid electrodes, means to apply said chrominance portion and said bursts of oscillations to one of said grid electrodes, means responsive to said synchonizing pulses to generate positive polarity pulses coinciding in time with said bursts of oscillation, means for substantially increasing the gain and maximum output of said chroma amplifier during the time interval when said bursts are applied to said one of said grid electrodes, said last named means comprising means to apply said pulses to the other of said grid electrodes, and a diode and a source of positive potential connected to said other grid electrode to limit the potential of said pulses.

4. In a color television receiver adapted to receive a video signal including during each scan line a luminance portion and a chrominance portion, and including between successive scan lines a synchronizing pulse and a burst of oscillations at a color subcarrier frequency, comprising, a chroma amplifier including a vacuum tube having a control grid and a screen grid, means to apply said chrominance portion and said bursts to said control grid, a horizontal deflection and high voltage supply circuit including a high voltage transformer, a secondary coil on said transformer providing a positive pulse during the occurrence of each of said bursts, a source of positive potential connected to one end of said secondary coil, and a connection from the other end of said secondary coil to said screen grid to apply said positive pulse thereto for appreciably increasing the gain and maximum output of said vacuum tube when said bursts are applied to said control grid relative to the gain and maximum output of said vacuum tube when said chrominance portion is applied to said control grid.

5. In a color television receiver adapted to receive a video signal including during each scan line a luminance portion and a chrominance portion, and including between successive scan lines a synchronizing pulse and a burst of oscillations at a color subcarrier frequency, comprising, a chroma amplifier including a vacuum tube having a control grid and a screen grid, means to apply said chrominance portion and said bursts to said control grid, a horizontal deflection and high voltage supply circuit including a high voltage transformer, a secondary coil on said transformer providing a positive pulse during the occurrence of each of said bursts, a source of positive potential connected to one end of said secondary coil, a connection from the other end of said secondary coil to said screen grid to apply said positive pulse thereto such as to substantially increase the gain and maximum output of said vacuum tube during the occurrence of each of said bursts, and a diode connected to limit the positive peak of said pulse.

6. In a color television receiver comprising a source of a composite signal including a chrominance signal comprising a modulated color subcarrier and also including periodically recurring color synchronizing bursts, the combination comprising a chrominance signal amplifier including a first and a second amplifying stage in cascade, said second amplifying stage including a vacuum tube having a control grid, a screen grid and an anode, means for applying a composite signal from said source to said control grid, means coupled to said anode for utilizing said chrominance signal, means additionally coupled to said anode for utilizing said color synchronizing bursts, means for supplying to said screen grid a direct current potential of a level substantially corresponding to the maximum screen grid potential rating of said vacuum tube, and means for periodically increasing the potential of said screen grid to a level substantially in excess of said maximum screen grid potential rating, said potential increasing means comprising a source of periodically recurring keying pulses, and means for applying keying pulses from said source to said screen grid in time coincidence with the appearances of said synchronizing bursts at said control grid.

7. In a signaling system including a source of a composite signal comprising a first intelligence signal time division multiplexed with a second intelligence signal, the second intelligence signal having a very short duty cycle relative to the duty cycle of said first intelligence signal, the combination comprising a composite signal amplifier including an electron tube having a control grid, a screen grid and an anode, means for applying said composite signal from said source to said control grid, utilization means for said first intelligence signal coupled to said anode, utilization means for said second intelligence signal additionally coupled to said anode, means for supplying said screen grid with a normal operating potential during the appearance of said first intelligence signal at said control grid, and means for regularly increasing the potential of said screen grid to a level substantially in excess of said normal screen grid operating potential only during the appearance of said second intelligence signal at said control grid.

References Cited in the file of this patent

UNITED STATES PATENTS

| | | |
|---|---|---|
| 2,519,238 | Duke et al. | Aug. 15, 1950 |
| 2,712,568 | Avins | July 5, 1955 |
| 2,751,431 | Kennedy | June 19, 1956 |
| 2,757,229 | Larky | July 31, 1956 |
| 2,794,065 | Dietch | May 28, 1957 |

| | | |
|---|---|---|
| 2,880,266 | Parker | Mar. 31, 1959 |
| 2,975,231 | Rhodes | Mar. 14, 1961 |

OTHER REFERENCES

Rider Television Manual, vol. 14, copyright 1954.

RCA Model 21–CT–55, Service Data 1954, #T13, first printing Nov. 24, 1954.

Admiral, Introduction to Color Television, p. 38. Exper. Chassis 38 al.

CBS, "Engineer's Handbook," vol. 1, CBS-Hytron, 12BY 7 page cited.